US009187573B2

(12) United States Patent
Berckmans et al.

(10) Patent No.: US 9,187,573 B2
(45) Date of Patent: Nov. 17, 2015

(54) PROCESS FOR MODIFYING STARCHES

(75) Inventors: Marc Charles Florent Berckmans, Brussels (BE); Stephane Jules Jerome Debon, Brussels (BE); Alexander Marie Ghislain Verbiest, Zuiddorpe (NL); Joel Rene Pierre Wallecan, Evere (BE)

(73) Assignee: Cargill, Incorporated, Wayzata, MN (US)

( * ) Notice: Subject to any disclaimer, the term of this patent is extended or adjusted under 35 U.S.C. 154(b) by 1189 days.

(21) Appl. No.: 12/670,579

(22) PCT Filed: Jul. 24, 2008

(86) PCT No.: PCT/EP2008/059746
§ 371 (c)(1),
(2), (4) Date: Jan. 25, 2010

(87) PCT Pub. No.: WO2009/013346
PCT Pub. Date: Jan. 29, 2009

(65) Prior Publication Data
US 2010/0159101 A1    Jun. 24, 2010

(30) Foreign Application Priority Data
Jul. 26, 2007  (EP) ..................................... 07113262

(51) Int. Cl.
*C08B 31/00*    (2006.01)
(52) U.S. Cl.
CPC .................... *C08B 31/003* (2013.01)
(58) Field of Classification Search
CPC ......... A23L 1/0522; A23L 1/39; A23L 1/187; A23L 1/24; A23L 2/00; A23C 13/00; C08B 30/00; C08B 30/12
USPC ................. 426/549, 661, 589, 579, 650, 590; 12/549, 661, 589, 579, 650, 590
See application file for complete search history.

(56) References Cited

U.S. PATENT DOCUMENTS 5,431,780 A      7/1995  Raehse et al.
2003/0108649 A1*  6/2003  Jeffcoat et al. ................ 426/578

FOREIGN PATENT DOCUMENTS

EP    0 032 296       7/1981
EP     0032296    *  8/1984  ................ C13L 1/08
(Continued)

OTHER PUBLICATIONS

Achayuthakan et al., Pasting and rheological properties of waxy corn starch as affected by guar gum and xanthan gum, Carbohydrate Polymers, vol. 71, 2008, pp. 9-17.
(Continued)

*Primary Examiner* — Preston Smith

(57) ABSTRACT

The present invention discloses a process for modifying starches comprising subjecting a non-pregelatinized starch and/or flour to a superheated steam treatment, wherein said superheated steam treatment is carried out in a reaction chamber of a reactor, said reaction chamber having at least one inlet and at least one outlet, and wherein the temperature of the superheated steam at the inlet of the reaction chamber is in the range of 150 to 650° C., preferably 250 to 550° C., more preferably 350 to 450° C., and wherein the temperature of the superheated steam at the outlet of the reaction chamber is in the range of 105 to 155° C., preferably 115 to 140° C., more preferably 115 to 125° C. The invention further refers to the starches obtained and baby foods, infant foods, sauces, soups, puddings, dressings, bakery creams, gravies and beverages comprising said starches. Also disclosed is a spray dryer for treating a heat-sensitive material with superheated steam comprising a reaction chamber having at least one inlet for the introduction into the chamber of a stream of superheated steam, at least one outlet for allowing the contents of the chamber to exit and a nozzle for producing a spray of droplets into the path of the stream of superheated steam, said spray of droplets being formed from a liquid containing the heat-sensitive material, wherein the reaction chamber is adapted such that, in use, the stream of superheated steam entering the reaction chamber becomes homogeneously distributed in the chamber and flows in a direction substantially parallel with the internal wall of the reaction chamber.

3 Claims, 5 Drawing Sheets

(56) References Cited

FOREIGN PATENT DOCUMENTS

| EP | 0214441 | 3/1987 |
|---|---|---|
| EP | 0 710 670 | 5/1996 |
| EP | 1 038 882 | 9/2000 |
| JP | 61-280244 | 12/1986 |
| WO | 2005/047340 | 5/2005 |
| WO | WO2009/013346 | 1/2009 |

OTHER PUBLICATIONS

Karkalas, An Improved Enzymic Method for the Determination of Native and Modified Starch, J. Sci. Food Agric. vol. 36, 1985, pp. 1019-1027.

Steeneken (1989). Rheological Properties of Aqueous Suspensions of Swollen Starch Granules, Carbohydrate Polymers, vol. 11, 1989, pp. 23-41.

Tester et al., Swelling and Gelatinization of Cereal Starches. I. Effects of Amylopectin, Amylose, and Lipids, Cereal Chemistry, vol. 67, 1990, n°6, pp. 551-557.

Frydman, A, in the thesis 'Caractérisation expérimentale et modélisation d'un procédé de séchage par pulverisation dans la vapeur d'eau surchauffée', ENSIA, 1998, pp. 3; 187-213.

TNO Environment, Energy and Process Innovation, Appeldoorn, The Netherlands, report R 2004/239 "Industrial superheated steam drying", 2004, pp. 2, 9-19.

\* cited by examiner

PROCESS FOR MODIFYING STARCHES

TECHNICAL FIELD

The present invention relates to a process for modifying starches by subjecting a non-pregelatinised starch to a superheated steam treatment. It, further, relates to pregelatinised starch products and to a spray drying apparatus for the modification of heat-sensitive materials using superheated steam.

BACKGROUND OF THE INVENTION

When a starch is pre-cooked, it can then be used to thicken cold foods. It is then referred to as a pregelatinised or instant starch. Otherwise starch requires heat to thicken, or "gelatinise." The actual temperature to gelatinise starch in excess of water depends on the type of starch. Pregelatinised starches are particularly widely used in convenience foods such as instant soups, instant sauces, instant gravies, instant beverages, salad dressing mixes and the like, in dairy foods such as instant puddings and the like, in bakery foods such as cake mixes, bakery creams and the like, and in instant baby and infant foods.

The terms "gelatinised" or "cooked" starch refers to swollen granules which have lost their polarisation crosses and which may or may not have lost their granular structure. The thermal processes generally employed to prepare pregelatinised starches include roll drying, extrusion, high temperature heating in alcohol/water systems and spray cooking/drying. The physical properties of the pregelatinised starches, in particular the wettability, the dispersibility and peak viscosity in cold water, are dependent on the process used to pregelatinise the starch.

Roll-dried and spray cooked/dried starches are the most widely used pregelatinised starches on the market. These starches generally have less thickening power and less gelling tendency than the corresponding granular starch upon gelatinisation. The loss in thickening and gelling potential is related to the partial destruction of the hydrated granular structure. Roll-dried starches typically have less thickening power compared to spray cooked/dried starches. From a thermodynamic perspective, both common processes, roll drying and spray cooking/drying, are also not very energy efficient. There is therefore a need for starches which have high thickening powers in cold liquids and can be produced via a process that is energetically more efficient compared with roll drying and spray cooking/drying. The process of this invention provides such starches.

Superheated steam as a drying medium is an emerging technology and relatively unknown. A study concerning this drying technology has been carried out by TNO Environment, Energy and Process Innovation, Appeldoorn, The Netherlands, report R 2004/239 "Industrial superheated steam drying".

Frydman, A, in the thesis 'Caractérisation expérimentale et modélisation d'un procédé séchage par pulverisation dans la vapeur d'eau surchauffée', ENSIA, 1998, mentions that starch can be pregelatinised by superheated steam treatment.

JP61-280244 discloses the heat treatment of starch in the presence of superheated steam of temperatures between 105 and 350° C. for less than 5 minutes at gauge-pressures of less than 9 kg/cm$^2$.

The process according to the present invention provides starch products with novel and superior functionalities than conventional pregelatinised starches.

SUMMARY OF THE INVENTION

The current invention relates to a process for modifying starches. The process comprises subjecting a non-pregelatinised starch and/or flour to a superheated steam treatment in a reaction chamber of a reactor, wherein the reaction chamber has at least one inlet and at least one outlet. The temperature of the superheated steam at the inlet of the reaction chamber of the reactor is in the range of 150 to 650° C., preferably 250 to 550° C., more preferably 350 to 450° C., and the temperature of the superheated steam at the outlet of the reaction chamber of the reactor is in the range of 105 to 155° C., preferably 115 to 140° C., more preferably 115 to 125° C.

The reactor is preferably selected from the group consisting of spray dryer, fluidised bed dryer, flash dryer, pneumatic dryer, belt dryer, rotary drum dryer, mixing dryer, ring dryer, reactors as disclosed in WO2005/047340 (hereinafter "turbo reactor"), reactors as disclosed in EP 0 710 670 (hereinafter "turbo reactor"), and combinations thereof.

The invention further relates to starches which are obtainable according to the process of the invention. In particular, it relates to a pregelatinised starch having, in UDMSO (9 volumes DMSO, 1 volume 6M urea) at a concentration of 8 mg/ml at 25° C., a ratio of apparent viscosity of said pregelatinised starch to the apparent viscosity of the corresponding parent non-pregelatinised starch, of at least 1.05 at 1 s$^{-1}$, preferably at least 1.10 at 1 s$^{-1}$, more preferably about 1.15 at 1 s$^{-1}$. More particularly, the invention relates to a low amylose starch and to amylose-containing starches whose normalised storage modulus G'/(c/c*) in a 6% aqueous dispersion by weight at 30° C. is at least 80 Pa, preferably at least 100 Pa, more preferably at least 120 Pa.

Furthermore, the invention relates to the use of the starches according to the present invention in food, feed, cosmetics and pharmaceutical applications.

DETAILED DESCRIPTION OF THE INVENTION

Figure 1:
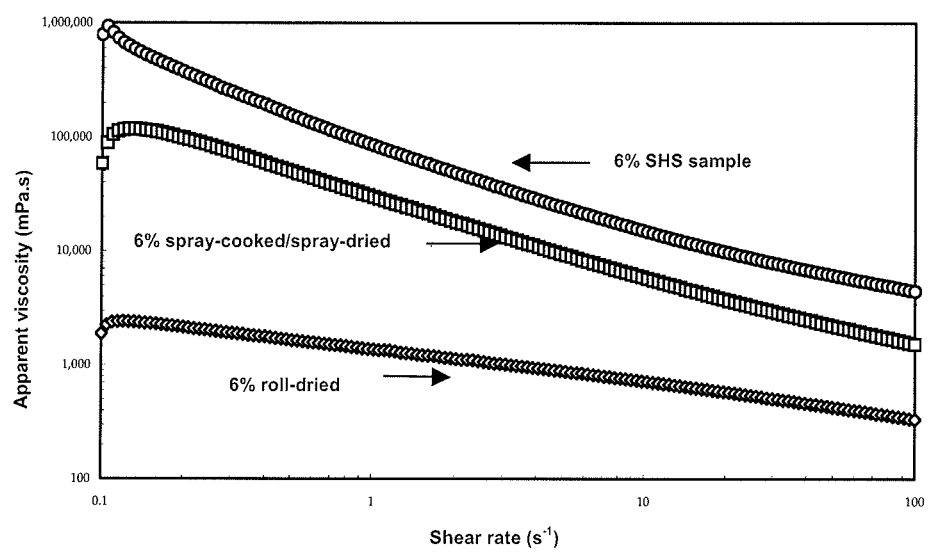
FIG. 1 gives the comparison of the apparent viscosity (mPa·s) as a function of the shear rate (s$^{-1}$) between 6% aqueous dispersions made of a low amylose corn starch treated according to the invention (SHS sample) and a conventional spray cooked/dried and roll dried low amylose corn starch. For all three samples, the starting material was the same low amylose corn starch (C*Gel 04201, Cargill).

The term "superheated steam" in the present invention means steam (=gaseous water) heated to a temperature higher than the boiling point corresponding to its pressure. It cannot exist in contact with water, nor contains water, and resembles a perfect gas. It is also called surcharged steam, anhydrous steam, and steam gas.

The term "reactor" in this context means any reactor that is suitable for treating non-pregelatinised starch with superheated steam.

"Reaction chamber" within this context is the place within the reactor where the reaction between the non-pregelatinised starch and the superheated steam takes place. The term "reaction chamber" is not limited to the form of a chamber but can for example be in the form of a tube provided that the "reaction chamber" possesses at least one inlet and at least one outlet.

The term "continuous reactor" as used herein is intended to distinguish such a reactor from a batch-type reactor.

The non-pregelatinised starches can be derived from any native source, wherein native relates to the fact that said starch is found in nature. Unless specifically distinguished, references to starch in this description are meant to include their corresponding flours, which are still containing proteins, such as wheat gluten (hereinafter "starch"). Typical sources for the starches are cereals, tubers, roots, legumes, fruit starches and hybrid starches. Suitable sources include but are not limited to corn, pea, potato, sweet potato, sorghum, banana, barley, wheat, rice, sago, amaranth, tapioca, arrowroot, canna, and low amylose (containing no more than about 10% by weight amylose, preferably no more than 5%) or high amylose (containing at least about 40% by weight amylose) varieties thereof. Also suitable are starches derived from a plant obtained by breeding techniques including crossbreeding, translocation, inversion, transformation or any other method of gene or chromosome engineering to include variations thereof. In addition, starch derived from a plant grown from artificial mutations and variations of the above generic composition, which may be produced by, known standard methods of mutation breeding are also suitable herein. Modifications are intended to include chemical modifications and physical modifications. The chemical modifications are intended to include without limitation, acetylated starches, hydroxyethylated and hydroxypropylated starches, inorganically esterified starches, cationic, anionic, oxidized starches, zwitterionic starches, starches modified by enzymes, and combinations thereof, provided that the starches are not pregelatinised. Physically modified starches such as thermally inhibited starches as disclosed for example in EP Patent No. 1 038 882 may also be suitable for use herein. In one preferred embodiment of the process of the invention, the starch to be treated is low amylose starch. More preferably, the low amylose starch is a low amylose corn starch. Alternative preferred embodiments are potato starch, tapioca starch, n-OSA (n-octenyl succinic anhydride) low amylose starch. It is to be understood that mixtures of any of the above mentioned non-pregelatinised starches and/or flours are also within the scope of this invention.

According to the process of the current invention, the non-pregelatinised starch is treated with superheated steam in a reaction chamber of a reactor. The temperature of the superheated steam at the inlet and the outlet of the reaction chamber of the reactor is crucial. The temperature of the superheated steam at the inlet of the reaction chamber is in the range of 150 to 650° C., preferably 250 to 550° C., more preferably 350 to 450° C., and the temperature at the outlet of the reaction chamber is in the range of 105 to 155° C., preferably 115 to 140° C., more preferably 115 to 125° C. Further interesting results are obtained by running the process such that the temperature of the superheated steam at the inlet of the reaction chamber is 200° C., 205° C., 210° C. or 230° C.

Typically, the non-pregelatinised starch will be in the form of an aqueous starch slurry having a pH of from 2 to 11, preferably 2 to 10.5, more preferably 2 to 10, even more preferably 2 to 9, yet more preferably from 3 to 8 and most preferably from 4 to 8.

The superheated steam is injected into the reaction chamber and thereby displaces the air or other gas present in the reaction chamber, or if the process is carried out in a closed system, the air or other gas is displaced from the whole system. Generally, the superheated steam is blown through the reactor before the reaction of non-pregelatinised starch with superheated steam until the air or other gas has been displaced. The absence of air in the reaction chamber makes the process according to the present invention explosion-proof. It must be understood that depending on the type of reactor and the size of the reaction chamber, the inlet velocity of the superheated steam into the reaction chamber needs to be adjusted so that the superheated steam temperature at the outlet of the reaction chamber falls within the above given temperature ranges. The starch entering the reaction chamber is dispersed in the form of a colloidal suspension (slurry, cake, powder). If the starch enters the reaction chamber in the form of an aqueous slurry, the temperature of said aqueous starch slurry needs to be sufficiently below the gelatinisation temperature of said starch. The starch slurry preferably has a solids content of from 1 to 40% by weight, more preferably between 10 and 35%, even more preferably of 20 to 35%.

When the incoming starch slurry has a solids content of 17.8%, the outcoming powder has a volume mean diameter of at least 30 μm. When the incoming starch slurry has an increased solids content of 26.7%, the powder coming out of the reactor has a volume mean diameter of at least 50 μm. When an incoming slurry with 35.6% dry solids is fed to the process, the outcoming powder has a volume mean diameter of at least 60 μm.

Any reactor is, in principle, suitable for carrying out the process according to the present invention provided that the superheated steam is homogeneously distributed. In particular, reactors can be of the batch- or continuous type. Suitable types of reactors are reviewed in the TNO Environment, Energy and Process Innovation, Appeldoorn, The Netherlands, report R 2004/239 "Industrial superheated steam drying". Particularly suitable reactors are continuous reactors selected from the group consisting of spray dryers, fluidised bed dryers, flash dryers, pneumatic dryers, belt dryers, rotary drum dryers, mixing dryers, ring dryers, reactors as disclosed in WO2005/047340 (hereinafter "turbo reactor"), reactors as disclosed in EP 0 710 670 (hereinafter "turbo reactor") and combinations thereof.

These different types of drying apparatus operate according to different principles. These principles are briefly described below:—

Fluid Bed Principle:
  A bed of solid particles is fluidized by an upward stream of gas enabling heat and mass exchange.

Pneumatic Conveyor e.g.: Flash/Ring Principle
  The product is pneumatically conveyed through a duct with a gas at high velocity enabling heat and mass exchange.
  The inlet product is dispersed in the gas stream e.g.: injector/disintegrator, cage mill.
  The product is separated from the gas in a cyclone or filter.
  Additionally with the Ring principle a classifier controls the residence time/recirculation of part of the product.

Direct Heat Rotary Drum Principle:
  The product is conveyed through a rotating tube equipped with baffles in a stream of gas enabling heat and mass exchange.
  The residence time/transport of the product is controlled by the slope of the tube.

Spray Principle:
  The product is sprayed in a co- or counter-current stream of gas via an atomizer, e.g.: pressurized nozzle, multi-fluid nozzle or a rotary atomizer, in a large cylindrical chamber, usually vertical,
  The gas stream flow allows control of the residence time,
  Heat transfer and mass transfer are accomplished by direct contact of gas with the dispersed droplets,
  The product is separated from the gas in a cyclone or filter.

Preferably, the dryer used in the present invention will be capable of working under "close loop superheated steam" to maximize the energy efficiency during drying (i.e. to recuperate the latent energy of evaporation). Any dryer used in the present invention will typically be capable of working under pressurized conditions up to 500,000 Pa (5 barg).

Turbo Principle:

The product passing through a cylindrical equipment is mechanically conveyed by a rotating shaft equipped with paddles, controlling residence time/transport of the product.

Thorough mixing of the solid, renewal of surface, good exchange of heat and mass are guaranteed.

A turbo reactor according to WO2005/047340 is a reactor having a tubular, preferably cylindrical, body within which is positioned a rotating shaft upon which is disposed one or a plurality of blades, and wherein the starch and gas are introduced into the reactor in opposing directions. A turbo reactor according to EP 0 710 670 is a reactor comprising a cylindrical, tubular body with a horizontal axis, having inlets for the admission of agents and for the outlet of the final product, a bladed rotor supported for rotation in the cylindrical, tubular body. In one preferred embodiment of the invention, the continuous reactor is a spray dryer, ring dryer, fluidised bed dryer, turbo reactor, more preferably a spray dryer. A person skilled in the art will very well understand that a reactor needs to be adjusted for the use with superheated steam in order to be suitable for the process of the present invention. It is to be understood that the process according to the invention can be carried out under different pressure conditions, i.e. under overpressure, atmospheric pressure, and underpressure. All of these process conditions are within the scope of this invention. Preferably, the process is carried out under atmospheric pressure.

The current invention also relates to the equipment allowing the superheated steam treatment of starch. Conventional equipment can, as mentioned above, be used for carrying out the process of the invention, such as spray dryers, fluidised bed dryers, flash dryers, pneumatic dryers, belt dryers, rotary drum dryers, mixing dryers, ring dryers, reactors as disclosed in WO2005/047340 (hereinafter "turbo reactor"), reactors as disclosed in EP 0 710 670 (hereinafter "turbo reactor"), and combinations thereof, provided that the stream of superheated steam is homogeneously distributed and does reduce the risk of having heavily turbulent interactions. The present invention, however, further provides a spray dryer in which the superheated steam treatment of a heat-sensitive material, such as a material selected from carbohydrates, proteins and lipids, for example a non-pregelatinised starch or flour, may be carried out. The spray dryer of the invention comprises a reaction chamber having at least one inlet for the introduction into the chamber of a stream of superheated steam, at least one outlet for allowing the contents of the reaction chamber to exit and a nozzle for producing a spray of droplets into the path of the stream of superheated steam, said spray of droplets being formed from a liquid containing the heat sensitive material wherein the reaction chamber is adapted such that, in use, the stream of superheated steam entering the reaction chamber becomes homogeneously distributed in the chamber and flows in a direction substantially parallel with the internal wall of the reaction chamber, preferably for at least one fifth of the length of the chamber. A preferred equipment is a spray dryer having a design that allows, in the first part of the reactor up, to at least ⅕ of the length of the dryer a homogeneous distribution of the stream of superheated steam such that the stream is more or less parallel with the wall of the dryer. Means are provided, in the reaction chamber at or close to the inlet for the superheated steam, for ensuring that the stream of superheated steam is homogeneously distributed within the reaction chamber and flows parallel or substantially parallel with the wall of the reaction chamber.

The inventors of the present invention have surprisingly found that by treating non-pregelatinised starch with superheated steam according to the process of the invention, the obtained starches exhibit a much higher cold water viscosity and storage modulus G' at 6% concentration than pregelatinized starches prepared by the known roll drying and spray cooking/drying methods. The storage modulus G' and the viscosity were measured with a MCR300 rheometer from Anton Paar Physica, Germany, equipped with a cylinder measuring system called starch cell and a shaft ST24 (also from Anton Paar Physica). Further information concerning the storage modulus and viscosity in general can be found in *The Rheology Handbook*, Metzger, T. G. (Vincentz Verlag, Hannover, Germany).

Figure 2:
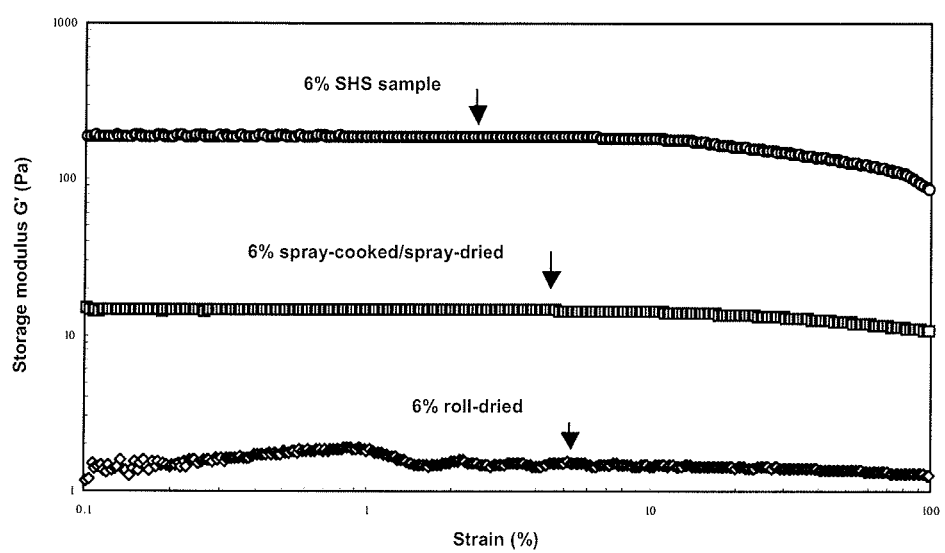
FIG. 2 gives the comparison of the storage modulus G' (Pa) as a function of the strain (%) applied between 6% aqueous dispersions made of a low amylose corn starch treated according to the invention (SHS sample) and a conventional spray cooked/dried and roll dried low amylose corn starch. For all three samples, the starting material was the same low amylose corn starch (C*Gel 04201, Cargill).

The process according to the current invention is particularly suitable for the treatment of low amylose starches, more particularly to amylose-containing starches. Low amylose corn starches obtained according to the process of the current invention are characterised in that the normalised storage modulus $G'/(c/c^*)$ of a 6% aqueous dispersion by weight of said starch at 30° C. is at least 80 Pa, preferably at least 100 Pa, more preferably at least 120 Pa. These values are unexpectedly much higher than the values obtained for low amylose corn starches obtained via the conventional roll drying and spray cooking/drying processes. The instant viscosity of a 6% aqueous dispersion at 30° C. of a low amylose corn starch according to the present invention is also much increased compared with conventional pregelatinised low amylose corn starches. This is shown in FIG. 1. Furthermore, a comparison between the storage modulus values (G') of the different starches is given in FIG. 2. A comparison between the normalised storage modulus values $G'/(c/c^*)$ is given in Examples 1-2-3-4.

Starches prepared according to the process of the current invention are, due to their high instant viscosity development, suitable in many different applications, in food, in feed, cosmetics and pharmaceutical applications. In particular, they are suitable for preparing convenience foods, dairy foods, bakery foods and tablets. Sauces, soups, gravies, puddings, dressings, bakery creams and beverages comprising starches prepared according to the process of the present invention show improved properties in terms of instant viscosity development and dispersibility, and particularly, the Brookfield viscosity in cold liquids is much higher than if other starches are employed. The starches prepared according to the process of the current invention are specifically suitable for use in baby and infant foods. It is crucial in baby and infant food applications that all ingredients have a low microbiological load (amount of microorganisms). The elevated temperatures at which the starch is treated according to the process of the present invention ensure that no microbiological contaminants survive the superheated steam treatment. Furthermore, a closed process, i.e. a process carried out in a system where the starch or flour is not exposed at any time to the environment from the superheated steam treatment to the packaging of the obtained product, ensures that the products will not be contaminated. Therefore, the starches of the present invention can be directly employed in baby and infant foods without the need of any additional treatment. It was also found that soups prepared using starches obtained according to the process of the current invention generally show a better dispersibility and higher Brookfield viscosity than soups using conventional pregelatinised starches. Starches obtained according to the process of the current invention show particular high viscosity development when mixed with fats and dry ingredients. Dry ingredients include but are not limited to vegetables, meats, bread crumbs, spices, herbs, sodium glutamate, and the like. Additionally, puddings prepared using starches obtained according to the process of the current invention also generally show, in addition to the higher Brookfield viscosity, a superior texture.

As stated above, the present invention also provides a spray dryer in which the superheated steam treatment of a heat-sensitive material, such as a material selected from carbohydrates, proteins and lipids, for example a non-pregelatinised starch or flour, may be carried out. The spray dryer of the invention comprises a reaction chamber having at least one inlet for the introduction into the chamber of a stream of superheated steam, at least one outlet for allowing the contents of the reaction chamber to exit and a nozzle for producing a spray of droplets into the path of the stream of superheated steam, said spray of droplets being formed from a liquid containing the heat sensitive material wherein the reaction chamber is adapted such that, in use, the stream of superheated steam entering the reaction chamber becomes homogeneously distributed in the chamber and flows in a direction substantially parallel with the internal wall of the reaction chamber, preferably for at least one fifth of the length of the chamber. A preferred equipment is a spray dryer having a design that allows, in the first part of the reactor up, to at least ⅕ of the length of the dryer a homogeneous distribution of the stream of superheated steam such that the stream is more or less parallel with the internal wall of the dryer. Means are provided, in the reaction chamber at or close to the inlet for the superheated steam, for ensuring that the stream of superheated steam is homogeneously distributed within the reaction chamber and flows parallel or substantially parallel with the internal wall of the reaction chamber. The spray dryer of the present invention, according to a preferred embodiment, comprises a frustoconical member located inside the reaction chamber at or near to the inlet for the superheated steam, with its narrower end uppermost in the chamber, and spaced apart from the internal wall of the reaction chamber so as to define an annular passage between the frustoconical member and the internal wall of the chamber for the flow of superheated steam. By this means, the frustoconical member acts as a baffle to deflect superheated steam flow towards the internal wall of the chamber. Superheated steam is, thus, caused to flow adjacent to the internal wall of the chamber and in a direction more or less parallel with the internal wall. This flow path reduces or prevents turbulence in the reaction chamber. The nozzle, provided in the reaction chamber, will be connected to a liquid feed containing the heat-sensitive material to be subjected to the treatment with superheated steam in the chamber. The liquid feed will typically be an aqueous solution or an aqueous slurry of the heat-sensitive material and will typically be supplied under pressure, such as by means of a pump, from a holding vessel to the nozzle. Any type of nozzle conventionally used in spray drying equipment may be used in the present invention, for example, a pressurized nozzle, multi-fluid nozzle or a rotary atomizer. The dryer will, typically, be capable of working under pressurized conditions up to 500,000 Pa (5 barg). The reaction chamber preferably has a circular cross section. It may be cylindrical, i.e. having a constant diameter. Alternatively, it may include a frustoconical section at one end of the chamber, the nozzle and the inlet for the stream of superheated steam being provided at the top of the frustoconical section of the reaction chamber. Preferably, the spray dryer also comprises a perforated member located inside the reaction chamber at or near the inlet for the superheated steam and perpendicular or substantially perpendicular to the flow of superheated steam. The perforated member has a plurality of perforations through which the superheated steam can pass and may, typically, be a perforated plate, a mesh or a sieve. According to one embodiment, the perforated member is located inside the reaction chamber upstream of the frustoconical member. Alternatively, the perforated member is located downstream of the frustoconical member or may be located in a position where it abuts either the upstream periphery or the downstream periphery of the frustoconical member. The perforated member may be fixed or otherwise held in position inside the reaction chamber such that it lies substantially across the direction of flow of the superheated steam in the reaction chamber. Typically, the nozzle will be located adjacent to the inlet for superheated steam. If a perforated member is present in the chamber, the nozzle will be located downstream of the perforated member. Preferably, the nozzle will be located concentrically within the frustoconical member in order to optimise the extent of contact of the spray containing the heat-sensitive material when it enters the reaction chamber with the stream of superheated steam and to minimise or prevent any turbulence within the stream of superheated steam.

More preferably, the heat-sensitive material to be treated with the stream of superheated steam in the spray dryer of the invention will, typically, be selected from carbohydrates, lipids and proteins. Examples of carbohydrates include monosaccharides, oligosaccharides, polysaccharides and reduced carbohydrates. Examples of lipids include fats, oils and hydrogenated fats. Examples of proteins include proteins, peptides and amino acids. According to a preferred embodiment, the heat-sensitive material is a non-pregelatinised starch or flour.

More preferably, the current invention relates to such a specific spray dryer wherein the stream of superheated steam has a velocity in the vicinity of the atomiser equal to or below 15 m/s, preferably below 10 m/s, most preferably below 2 m/s. This type of construction may be among other alternatives achieved through the appropriate placement of well-tight sieves containing up to at least 40%, preferably at least 50%, more preferably at least 70% open surface (as multiple holes) based upon the surface of the sieve, and/or combined with a conical structure that allows quasi even or quasi homogeneous distribution of the stream of superheated steam at the first part of the equipment.

When the incoming starch slurry has a solids content of 17.8%, the outcoming powder has a volume mean diameter of at least 30 µm. When the incoming starch slurry has an increased solids content of 26.7%, the powder coming out of the reactor has a volume mean diameter of at least 50 µm. When an incoming slurry with 35.6% dry solids is fed to the process, the outcoming powder has a volume mean diameter of 60 µm.

Figure 3:
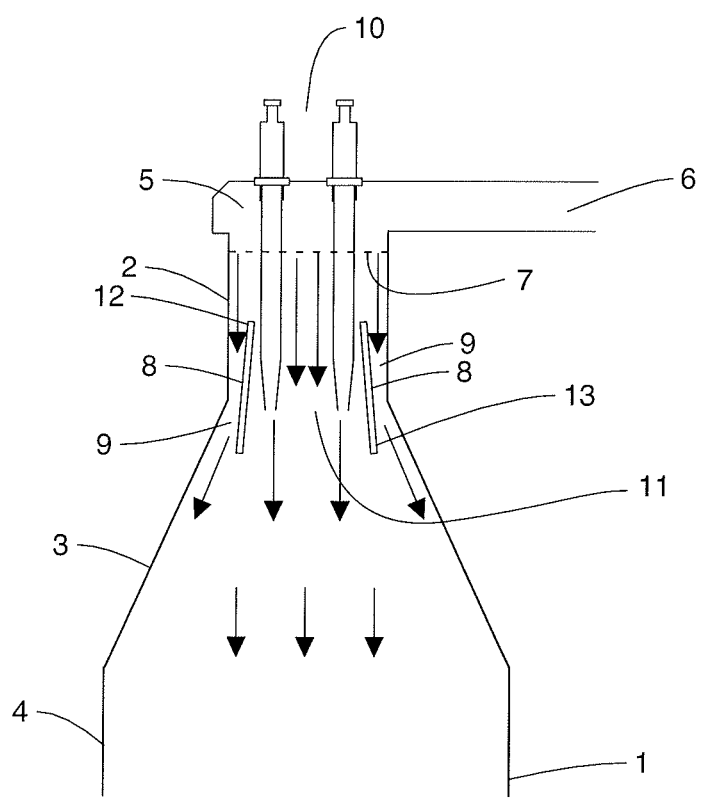
FIGS. 3, 4 and 5 are partial diagrammatic representations of different embodiments of reaction chambers that may be used in the spray dryer of the present invention.
Figure 4:
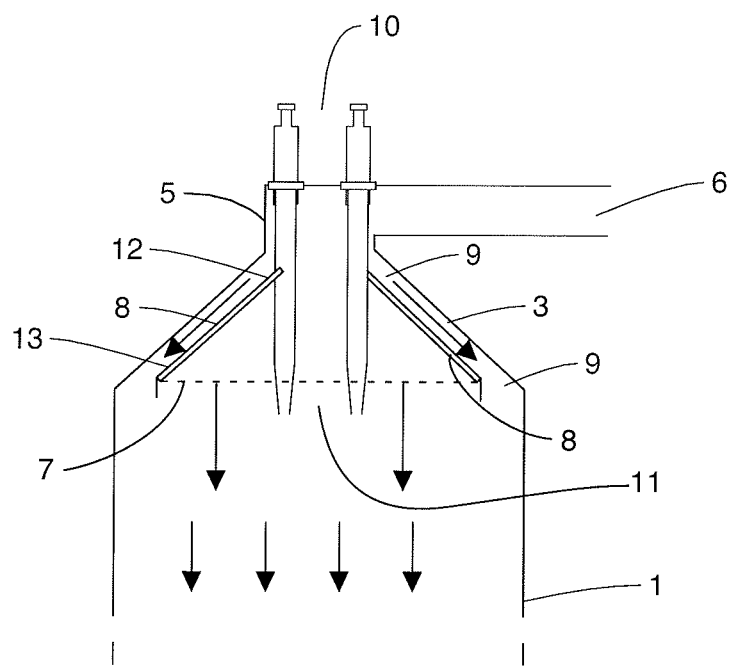
Figure 5:
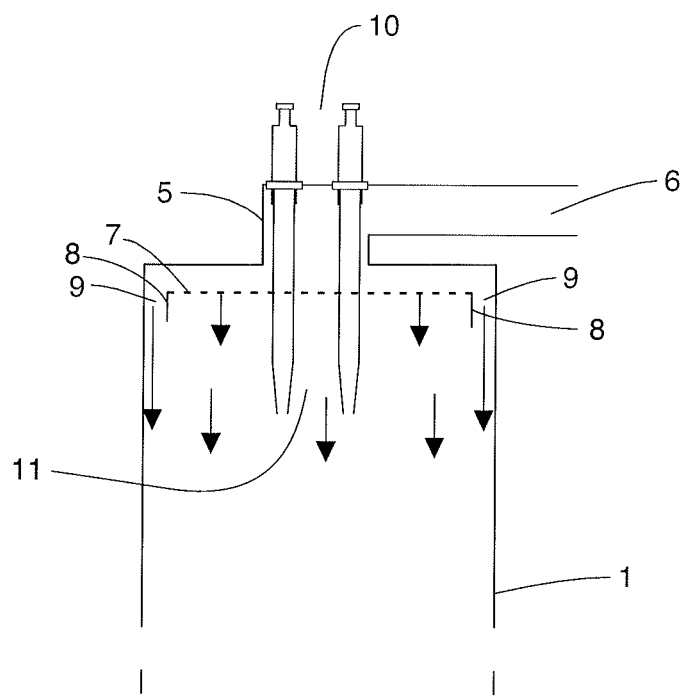

Three different embodiments of the spray dryer according to the invention are described in detail below with reference to the accompanying drawings, wherein FIG. 3 is a schematic cross-sectional view of the upstream end of a reaction chamber according to a preferred embodiment of the invention;

FIG. 4 is a schematic cross-sectional view of the upstream end of a reaction chamber according to another embodiment of the invention; and FIG. 5 is a schematic cross-sectional view of the upstream end of a reaction chamber according to yet another embodiment of the invention.

In the drawings, the same reference numerals have the same meanings and, accordingly, may only be explained once. The upstream end of the reaction chamber shown in FIG. 3 has a chamber wall 1 having a cylindrical neck portion 2, a frustoconical portion 3 and a cylindrical body portion 4. The neck portion 2 of the chamber wall is connected to a head 5 which provides an inlet 6 for superheated steam. In use, inlet 6 is connected to a source of superheated steam (not shown). A circular perforated plate 7, provided with a plurality of perforations, is mounted inside the neck portion of the reaction chamber and abuts the internal wall of portion 2 near to the head 5. Downstream of plate 7 is a frustoconical member 8, having upstream periphery 12 and downstream periphery 13, spaced apart from the internal wall of portions ⅔ so that it, and the internal wall, together define an annular passage 9. In use, frustoconical member 8 acts as a baffle to direct part of the stream of superheated steam entering via inlet 6 through the passage 9 so that it flows into the reaction chamber adjacent to the internal wall of the chamber and in a direction more or less parallel to the internal wall. The deflection of the flow of superheated steam by the member 8 results in the homogeneous dispersion of the superheated steam.

Inlet 10 is provided in the neck portion for the introduction of a heat-sensitive material into the reaction chamber. The nozzle 11 of the inlet 10 is downstream of perforated plate 7 and within the frustoconical member 8 such that, in use, droplets containing the heat-sensitive material sprayed from the nozzle 11 are contacted with the stream of superheated steam under non-turbulent flow. The solid particles of superheated steam-treated material, created by the spray drying process, are collected at the bottom (not shown) of the reaction chamber.

An alternative embodiment is shown in FIG. 4. In FIG. 4, head 5 is connected to the top of frustoconical portion 3 of the reaction chamber. Frustoconical member 8 is located internally in the reaction chamber inside the portion 3 such that the walls of the portion 3 and the member 8 are parallel. A circular perforated plate 7 is located at the downstream end of member 8, the edge of the plate 7 abutting the periphery 13 of member 8. In use, a stream of superheated steam enters inlet 6. Part of the steam flows through the reaction chamber via the perforations in the plate 7. Part of the inflowing superheated steam is deflected to flow through annular passage 9 into the body of the reaction chamber along a path adjacent to, and in the direction of, the internal wall of the chamber. The inlet 10 is located within the upstream periphery 12 of the member 8, passing through plate 7 such that the nozzle 11 is downstream of plate 7.

A different embodiment is shown in FIG. 5. In FIG. 5, the reaction chamber 1 is cylindrical with the central part of the end of the chamber being in open communication with head 5 providing an inlet 6 for superheated steam. Perforated plate 7 is located near to the upstream end of the cylindrical chamber. Adjacent the internal wall of the chamber, the edge of plate 7 is provided with a skirt to farm a frustoconical member 8. The skirt and the internal wall of the chamber together define an annular passage 9 adjacent the wall. The inlet 10, which is located within the head, leads to a nozzle 11 downstream of the plate 7.

Further to the above mentioned advantages, the process of the present invention has also the advantages that it is more energy efficient, explosion proof, and flavours lost during the process can potentially be recuperated. The process is more energy efficient due the better heat exchange of the superheated steam with the starch particles compared with conventional processes and the possibility of recycling of the superheated steam.

The current invention is illustrated in the following examples. In the examples, a spray dryer as illustrated in FIG. 3 and described hereinbefore was used.

Example 1

A 18.5% by weight on dry base low amylose corn starch (C*Gel 04201, Cargill) was slurryfied at 25° C. Before commencing with the superheated steam treatment, the reaction chamber was filled with a continuous stream of superheated steam having a flow rate of 400 m³/hour. The temperature of the superheated steam at the inlet of the reaction chamber was 400° C., the temperature at the outlet of the reaction chamber 130° C. The starch slurry was pumped with a flow rate of around 44 liter/hour to the reaction chamber, through a spray nozzle of the type Spraying Systems SK 77/21. The flow inlet pressure of the starch slurry was measured to be 110000 hPa. The dried superheated steam treated starch was then collected at the bottom of the reaction chamber. Rheology experiments were carried out on this sample.

Rheology Experiments of Aqueous Starch Pastes:

The tests were carried out on a MCR300 rheometer from Anton Paar Physica, Germany, equipped with a cylinder measuring system called a starch cell and a shaft ST24 (also from Anton Paar Physica). The starch paste was prepared by first measuring the starch moisture content with an IR moisture balance (Sartorius MA30) at 130° C. for 20 minutes. A known amount of starch (see Table 1) is weighed in a 600 ml beaker and wetted with 50 g ethylene glycol. 400 g buffer solution (0.02 M acetate buffer, pH 5.5) was added to the starch and the whole was mixed thoroughly with a large spoon for 1 minute. The paste was then allowed to rest for 1 hour at room temperature before carrying out the measurement.

TABLE 1

| Starch concentration | Starch weight (g, anhydrous basis) | Ethylene glycol (g) | 0.02M acetate buffer pH 5.5 (g) |
| --- | --- | --- | --- |
| 6% | 28.9 | 50 | 400 |

Rotation Test:

The viscosity measurements as a function of shear rate ($s^{-1}$) were carried out at 30° C. according to the following procedure.
    First interval of 10 minutes: non-recording
    Second interval of 587.9 seconds (9.8 minutes): recording of data points:
        150 measuring points
        shear rate 0.1 to 100 $s^{-1}$ The results of this rotation test are given in FIG. 1 and compared with the results obtained for the same low amylose corn starch that has been pregelatinised by conventional methods, i.e. roll drying (C*Gel-Instant 12410, Cargill) and spray cooking/drying (C*HiForm A 12791, Cargill). Both, the viscosity (mPa·s) and shear rate ($s^{-1}$), are printed in logarithmic scale.

Oscillation Test:

The storage modulus G' (Pa) measurements as a function of strain (%) were carried out at 30° C. according to the following procedure.
    First interval of 10 minutes: non-recording
    Second interval of 600 seconds (10 minutes): recording of data points:
        300 measuring points
        strain 0.1 to 100% log
        frequency 1 Hz The results of this oscillation test are given in FIG. 2 and compared with the results obtained for the same low amylose corn starch that has been pregelatinised by conventional methods, i.e. roll drying (C*Gel-Instant 12410, Cargill) and spray cooking/drying (C*HiForm A 12791, Cargill). Both, the storage modulus G' (Pa) and strain (%), are printed in logarithmic scale.

Measurement of Starch Swelling and Extent of Solubles.

Definition of Normalised Viscosity and Normalised Storage Modulus

Swelling Factor

The extent of starch swelling was measured at 30° C. using the direct method (100 mg starch) of [Tester and Morrison (1990). Swelling and Gelatinization of Cereal Starches. I. Effects of Amylopectin, Amylose, and Lipids. *Cereal Chemistry* vol. 67, n° 6, p. 551-557].

The addition of 5 mL 0.02M acetate buffer was performed with a positive displacement pipette under vigorous vortex-mixing to ensure lump-free starch hydration.

The centrifugation is 3,000 g for 10 minutes (instead of 1,500 g for 5 minutes).

The swelling factor at 30° C. is a dimensional.

Swelling Volume and Close Packing Concentration c*

The swelling factor was converted into a swelling volume q (mL/g) and a close packing concentration c* (g/mL) where $c^*=1/q$, using the method of [Steeneken (1989). Rheological Properties of Aqueous Suspensions of Swollen Starch Granules. *Carbohydrate Polymers* vol. 11, p. 23-41].

The conversion w/w % into w/v % was made assuming the density at 30° C.

d=0.997 g/mL for 0.02M acetate buffer
d=1.113 g/mL for ethylene glycol (99.0% by GC)
d=1.4 g/mL for pregelatinised starch Normalised Viscosity and Normalised Storage Modulus As described by Steeneken (1989), viscosity and storage modulus can be expressed as a function of the volume fraction (of swollen starch granules) $c/c^*=cq$.

$\eta/(c/c^*)$ is the normalised viscosity $G'/(c/c^*)$ is the normalised storage modulus Solubles, I.E α-Glucan Extractables at 30° C.

A known amount of starch (see Table 4) is weighed in a 600 ml beaker and wetted with 50 g ethylene glycol. 400 g buffer solution (0.02 M acetate buffer, pH 5.5) was added to the starch and the whole was mixed thoroughly with a large spoon for 1 minute. The paste was then stirred (magnetic stirring, 200 min$^{-1}$) for 30 minutes at 30° C.

TABLE 1

| Starch concentration | Starch weight (g, anhydrous basis) | Ethylene glycol (g) | 0.02M acetate buffer pH 5.5 (g) |
|---|---|---|---|
| 1% | 4.5 | 50 | 400 |

The extent of starch solubles was measured from the filtrate (through 0.45 μm) of the supernatant of the starch suspension (after centrifugation at 3,000 g for 10 minutes). The filtrate is hydrolysed with amyloglucosidase and the resulting glucose quantified with glucose oxidase-peroxidase-chromogen as described by [Karkalas (1985). An Improved Enzymic Method for the Determination of Native and Modified Starch. *J. Sci. Food Agric.* vol. 36 p. 1019-1027].

All data are reported at 30° C. in 0.02M acetate buffer pH 5.5

|  | Pregelatinised Waxy Maize starches | | |
|---|---|---|---|
|  | C*Gel-Instant 12410 | C*HiForm A 12791 | SHS |
| Granular integrity (light microscopy) | lost | Intact granules | |
| Swelling Factor (—) | Not measurable (turbidity) | 35.2 | 17.4 |
| Swelling volume q (mL/g anhydrous starch) |  | 27.8 | 13.3 |
| Close packing concentration c* (g anhydrous starch/mL) |  | 0.036 | 0.075 |
| G' (Pa) at c = 6% (0.062 g anhydrous starch/mL) | 1.7 | 14.5 | 189.5 |
| Normalised G'/(c/c*) (Pa) | Not applicable (granular integrity is lost) | 8 | 229 |
| Texture at c = 6% | Liquid (tan(δ) >1) | Long | Smooth and short |
| Solubles (w % anhydrous starch) | 37.8 | 16.7 | 1.6 |

Solution Properties in UDMSO

The inlet starches (cook-up, i.e. non-pregelatinised) and the outlet starches (SHS, i.e. pregelatinised) of the present invention were dissolved in UDMSO (9 volumes DMSO and 1 volume 6M urea) for 48 hours at room temperature: 800 mg anhydrous starch+100 mL UDMSO.

The apparent viscosity of the solutions was measured on a MCR301 rheometer from Anton Paar Physica, Germany, equipped with a coaxial cylinder double gap measuring system (DG 26.7) and a Peltier temperature device (H-PTD200). The viscosity measurements as a function of shear rate (s$^{-1}$) were carried out at 25° C. according to the following procedure.

First interval of 5 minutes: non-recording

Second interval of 1,650 seconds (27.5 minutes): recording of data points:

30 measuring points with variable integration time (100 to 10 s)

shear rate 1 to 100 s$^{-1}$

When insoluble non α-glucan material is present (e.g. protein in flour), it is recommended to leave the solution undisturbed (1 g overnight) or to centrifuge (1,000 g, minutes) prior measurement of apparent viscosity of the supernatant.

| Starches in UDMSO (~8 mg/mL) Waxy Maize | Apparent viscosity η at 1 s$^{-1}$ shear rate (mPa · s) | Apparent viscosity ratio η(outlet)/η(inlet) |
|---|---|---|
| C*Gel 04201 (inlet) | 50.2 | |
| SHS pre-gelatinised (outlet) | 91.3 | 1.82 |

Example 2

A 17.8% by weight on dry base potato starch (C*Gel 30002, Cargill) was slurryfied at 18° C. Before commencing with the superheated steam treatment, the reaction chamber was filled with a continuous stream of superheated steam having a flow rate of 300 m$^3$/hour. The temperature of the superheated steam at the inlet of the reaction chamber was 400° C., the temperature at the outlet of the reaction chamber 120° C. The starch slurry was pumped with a flow rate of around (30) liter/hour to the reaction chamber, through a spray nozzle of the type Spraying Systems SK 77/21. The flow inlet pressure of the starch slurry was measured to be (110000) hPa. The dried superheated steam treated starch was then collected at the bottom of the reaction chamber. Rheology experiments were carried out on this sample.

All data are reported at 30° C. in 0.02M acetate buffer pH 5.5

| Pregelatinised Potato starches | SHS |
|---|---|
| Granular integrity (light microscopy) | Intact granules |
| Swelling Factor (—) | 15.4 |
| Swelling volume q (mL/g anhydrous starch) | 11.7 |
| Close packing concentration c* (g anhydrous starch/mL) | 0.085 |
| G' (Pa) at c = 6% (0.062 g anhydrous starch/mL) | 209.1 |
| Normalised G'/(c/c*) (Pa) | 287 |
| Texture at c = 6% | Smooth and short |
| Solubles (w % anhydrous starch) | 10.8 |

Example 3

A 17.8% by weight on dry base tapioca starch (C*Gel 70001, Cargill) was slurryfied at 18° C. Before commencing with the superheated steam treatment, the reaction chamber was filled with a continuous stream of superheated steam having a flow rate of 300 m$^3$/hour. The temperature of the superheated steam at the inlet of the reaction chamber was 300° C., the temperature at the outlet of the reaction chamber 120° C. The starch slurry was pumped with a flow rate of around 30 liter/hour to the reaction chamber, through a spray nozzle of the type Spraying Systems SK 77/21. The flow inlet pressure of the starch slurry was measured to be 15000 hPa. The dried superheated steam treated starch was then collected at the bottom of the reaction chamber. Rheology experiments were carried out on this sample.

All data are reported at 30° C. in 0.02M acetate buffer pH 5.5

| | Pregelatinised Tapioca starches | | |
|---|---|---|---|
| | Co-Ball Colloid Mill (Berlin 2004) | C*HiForm A 72391 | SHS |
| Granular integrity (light microscopy) | lost | Intact granules | |
| Swelling Factor (—) | Not measurable (turbidity) | 34.0 | 16.4 |
| Swelling volume q (mL/g anhydrous starch) | | 26.8 | 12.5 |
| Close packing concentration c* (g anhydrous starch/mL) | | 0.037 | 0.080 |
| G' (Pa) at c = 6% (0.062 g anhydrous starch/mL) | 3.0 | 89.7 | 174.2 |
| Normalised G'/(c/c*) (Pa) | Not applicable (granular integrity is lost) | 54 | 225 |
| Texture at c = 6% | Phase separating | Slimy and long | Smooth and short |
| Solubles (w % anhydrous starch) | 58.1 | 16.7 | 9.8 |

| Starches in UDMSO (~8 mg/mL) Tapioca | Apparent viscosity η at 1 s$^{-1}$ shear rate (mPa·s) | Apparent viscosity ratio η(outlet)/η(inlet) |
|---|---|---|
| C*Gel 70001 (inlet) | 46.2 | |
| SHS pre-gelatinised (outlet) | 76.8 | 1.66 |

Example 4

A 17.8% by weight on dry base n-OSA low amylose corn starch (C*EmTex 06369, Cargill) was slurryfied at 18° C. Before commencing with the superheated steam treatment, the reaction chamber was filled with a continuous stream of superheated steam having a flow rate of 300 m$^3$/hour. The temperature of the superheated steam at the inlet of the reaction chamber was 400° C., the temperature at the outlet of the reaction chamber 120° C. The starch slurry was pumped with a flow rate of around 30 liter/hour to the reaction chamber, through a spray nozzle of the type Spraying Systems SK 77/21. The flow inlet pressure of the starch slurry was measured to be 110000 hPa. The dried superheated steam treated starch was then collected at the bottom of the reaction chamber. Rheology experiments were carried out on this sample.

| | Pregelatinised n-OSA starches | |
|---|---|---|
| | C*HiForm A 127R5 | SHS |
| Granular integrity (light microscopy) | Intact granules | |
| Swelling Factor (—) | 16.0 | 14.7 |
| Swelling volume q (mL/g anhydrous starch) | 12.2 | 11.1 |
| Close packing concentration c* (g anhydrous starch/mL) | 0.082 | 0.090 |
| G' (Pa) at c = 6% (0.062 g anhydrous starch/mL) | 335.4 | 288.7 |
| Normalised G'/(c/c*) (Pa) | 446 | 419 |
| Texture at c = 6% | Coarse and short | Smooth and short |
| Solubles (w % anhydrous starch) | 4.3 | 1.1 |

| Starches in UDMSO (~8 mg/mL) Waxy Maize, nOSA substituted | Apparent viscosity η at 1 s$^{-1}$ shear rate (mPa·s) | Apparent viscosity ratio η(outlet)/η(inlet) |
|---|---|---|
| C*Tex 06369 (inlet) | 125 | |
| SHS pre-gelatinised (outlet) | 173 | 1.38 |

Example 5

A soup was prepared using the starches from Example 1 obtained according to the process of the present invention (SHS sample), C*Gel-Instant 12410 from Cargill (roll dried) or C*HiForm A 12791 from Cargill (spray cooked/dried).

The recipe for the preparation of the soup was as follows:
- 13.25 grams of a dried soup ingredient mix (starch/hydrocolloid free)
- 6.25 grams of starch (95% by weight dry substance)
- 250 ml water (85° C.)
- stirring for approximately 1 minute The Brookfield viscosity of the three different soups was measured and the results are shown in Table 2. The Brookfield viscosity was measured on a Brookfield viscometer model DVII at 75° C., using a spindle 1 and a shear rate of 100 rpm.

TABLE 2

| Starch | Brookfield viscosity (mPa · s) | Dispersibility |
|---|---|---|
| SHS sample | 241 | No lumps, easily dispersible |
| C*Gel-Instant 12410 (Cargill) | 15.4 | Some lumps |
| C*HiForm A 12791 (Cargill) | 123 | Some lumps |

It was found that the sample obtained according to the present invention had a much higher viscosity and an improved dispersibility compared to the other samples.

Example 6

An instant choco pudding was prepared using the starches from Example 1 obtained according to the process of the present invention (SHS sample), C*Gel-Instant 12410 from Cargill (roll dried) or C*HiForm A 12791 from Cargill (spray cooked/dried).

The recipe for the preparation of the instant choco pudding was as follows:
- 31.5 grams sucrose
- 15.8 grams skimmed milk powder
- 3.15 grams cacao
- 12.6 grams of starch To the above mixture, 250 ml of water (20° C.) was added. The whole was mixed with a kitchen mixer for 1.5 minutes and then poured into cups. The cups were put into a fridge (temperature 8° C.) for 60 minutes. After that, the Brookfield viscosity was measured at 20° C. on the same viscometer as in Example 2 (using a spindle 3 and a shear rate of 20 rpm) and the texture of the different instant choco puddings compared. The results are listed in Table 3.

TABLE 3

| Starch | Brookfield viscosity (mPa · s) | Texture |
|---|---|---|
| SHS sample | 3680 | Good |
| C*Gel-Instant 12410 (Cargill) | 840 | Too liquid |
| C*HiForm A 12791 (Cargill) | 760 | Too liquid |

It was found that the sample obtained according to the present invention had a much higher viscosity and an improved texture compared to the other samples.

Example 7

Formulation

|  | Trial 1 |
|---|---|
| SHS starch according to example 1 | 99.25% |
| Magnesium Stearate | 0.5% |
| Aerosil | 0.25% |

Tabletting Apparatus

Equipment was a triple punch rotary press from Krosch. 500 g of powder was used to make the desired tablets.

Specifications of the tablets were: round flat-faced, 1 cm² surface, weight: 350 mg+/−5%, diameter: 11.35 mm.

Speed of rotation comprised 40 rpm

No problems were observed during production: no material stickiness occurred, flowability of the powder was good and low tablet ejection forces were registered.

Moisture Content Determination

Analysis was performed using an infrared balance. Temperature applied was 105° C. and 1 g of sample was followed until equilibrium was reached for 5 minutes.

|  | SHS native low amylose corn starch prepared according to example 1 |
|---|---|
| Moisture content (%) | 11.1 |

The moisture content of the starch was low enough to expect no problems in terms of tabletting behaviour.

Hardness

Determination of the hardness was done using a "Multicheck 5" apparatus from Erweka. Standard procedure of evaluation was applied and average value of 10 measurements was calculated.

Samples were taken at compression forces of 10, 20 and 30 kN and measured for hardness. Good tabletting properties were obtained, without capping and lamination.

The tablets made with SHS treated native low amylose corn starch (prepared according to example 1) are good compared with commercial specifications.

No problems were obtained during the trial in terms of flowability, product stickiness and ejection force.

The invention claimed is:

1. A process for modifying starches comprising:
subjecting a non-pregelatinised starch to a superheated steam treatment;
wherein said superheated steam treatment is carried out in a reaction chamber, having at least one inlet and at least one outlet, of a spray dryer, introducing a stream of superheated steam into at least one inlet of said reaction chamber, wherein the temperature of superheated steam at an inlet of the reaction chamber is in the range of from 150° C. to 650° C., wherein the temperature of superheated steam at an outlet of the reaction chamber is in the range of from 115° C. to 155° C., an internal wall, a perforated member having a plurality of perforations, wherein the perforated member is selected from the group consisting of a perforated plate, a mesh, and a sieve and wherein the perforated member is located inside the reaction chamber at an inlet for the superheated steam and substantially perpendicular to the direction of flow of the superheated steam, and a nozzle for producing a spray of droplets into the path of the stream of superheated steam, said spray of droplets being formed from a liquid containing the non pregelatinized starch, wherein the reaction chamber is adapted such that, in use, the stream of superheated steam entering the reaction chamber becomes homogenously distributed in the chamber and flows in a direction substantially parallel with the internal wall of the reaction chamber, wherein said spray dryer further comprises a frustoconical member located inside the reaction chamber at an inlet and spaced apart from the internal wall of the reaction chamber such that the frustoconical member and the internal wall of the chamber together define an annular passage for the flow of the stream of superheated steam.

2. The process according to claim 1, wherein the spray dryer is equipped with an atomizer which allows spraying up to a pressure of 110000 hPa (110 bar).

3. The process according to claim 1, wherein the non-pregelatinised starch is in the form of a slurry, and the non pregelatinized starch has a solids content of from 20% to 40%.

\* \* \* \* \*